Dec. 26, 1950 C. VAN AUSDALL 2,535,615
GARDEN TRACTOR
Original Filed July 17, 1946 2 Sheets-Sheet 1
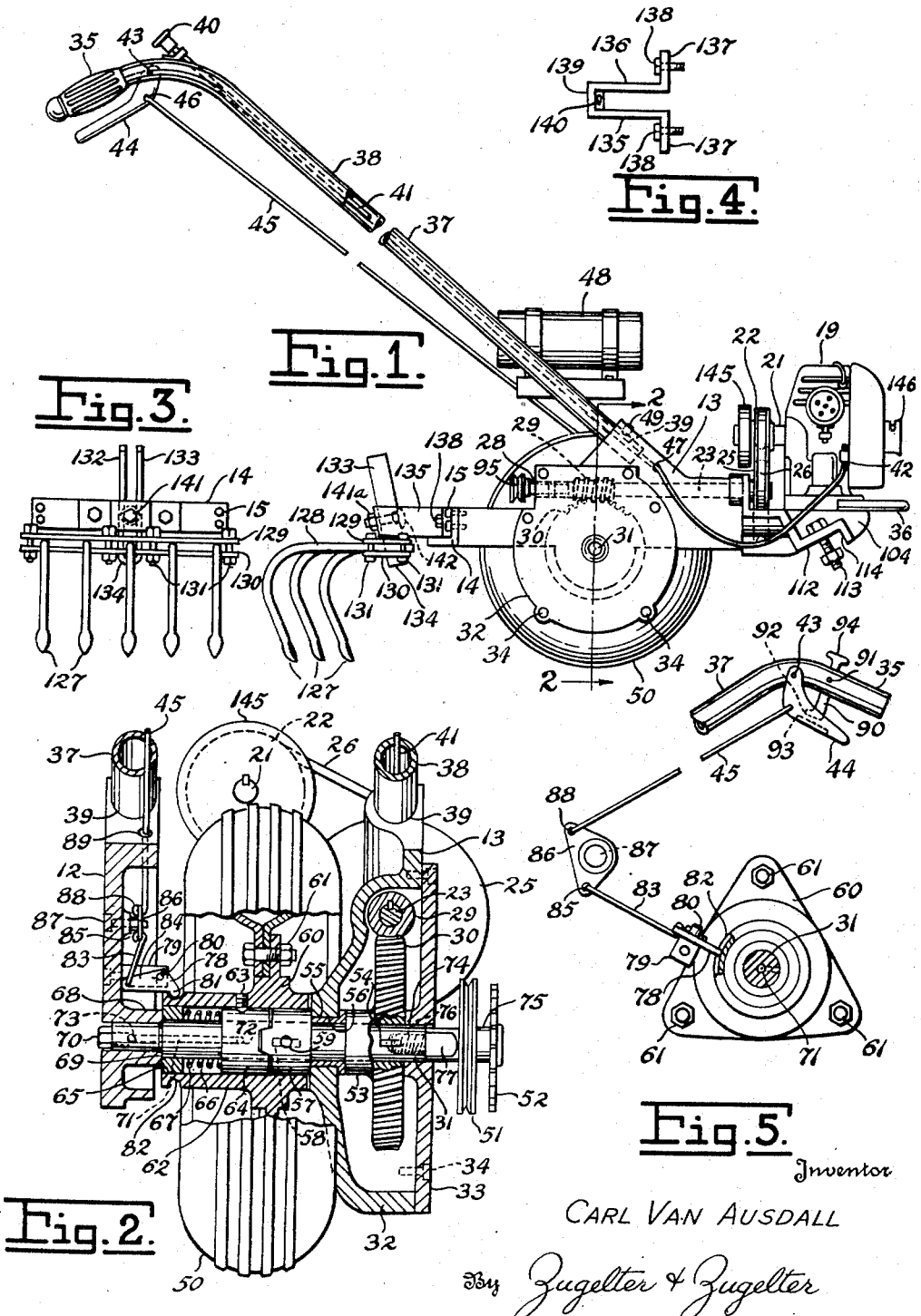
Inventor
CARL VAN AUSDALL
By Zugelter & Zugelter
Attorneys Dec. 26, 1950     C. VAN AUSDALL     2,535,615
GARDEN TRACTOR
Original Filed July 17, 1946     2 Sheets-Sheet 2
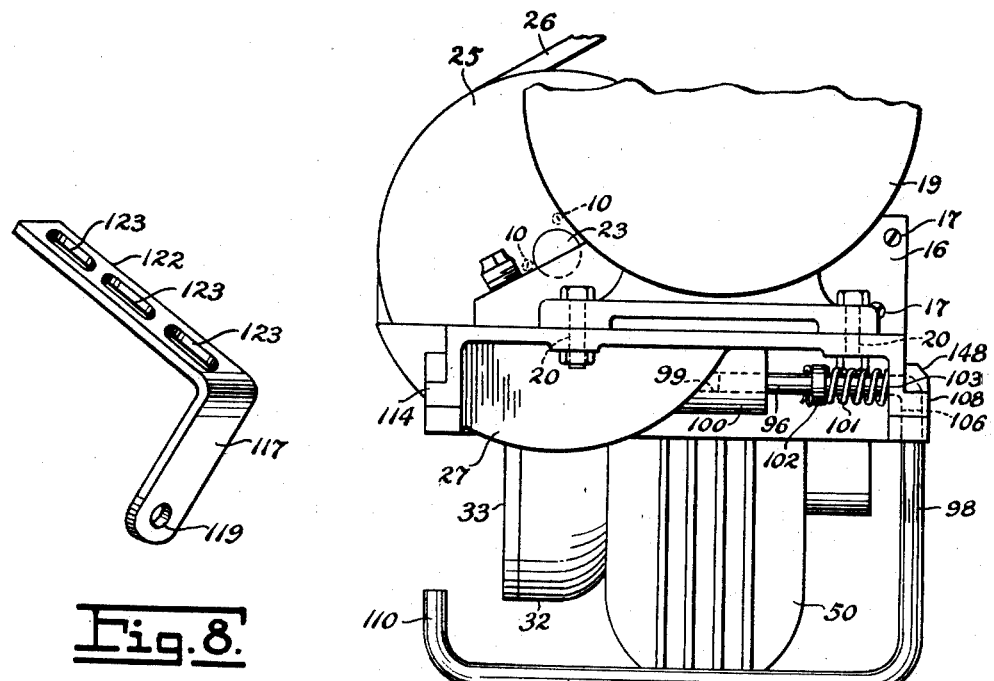
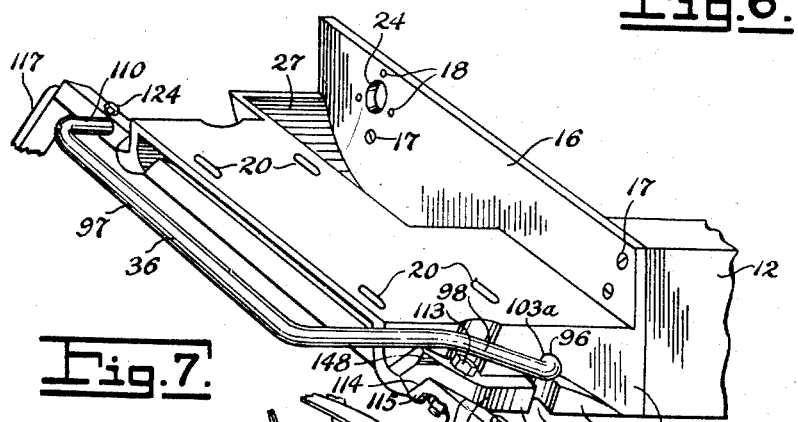
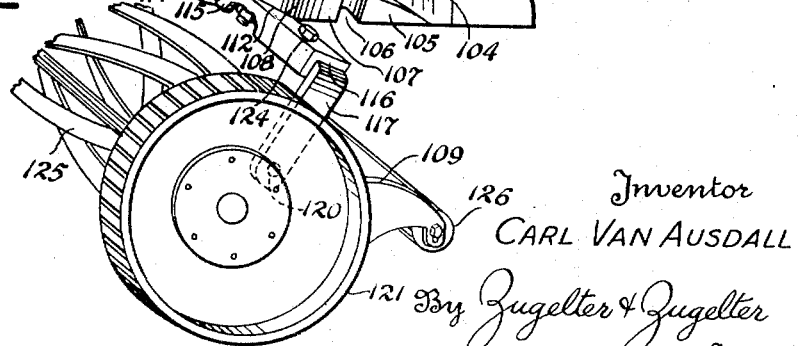
Inventor
CARL VAN AUSDALL
By Zugelter & Zugelter
Attorneys Patented Dec. 26, 1950

2,535,615

UNITED STATES PATENT OFFICE 2,535,615

GARDEN TRACTOR

Carl Van Ausdall, Liberty, Ind.

Original application July 17, 1946, Serial No. 684,173. Divided and this application March 11, 1948, Serial No. 14,253

6 Claims. (Cl. 180—19)

This is a division of my application Serial No. 684,173 filed July 17, 1946, now Patent No. 2,535,614, granted Dec. 26, 1950.

This invention relates to a tractor, which is designed especially for home use or limited commercial application, and wherein are desired the advantages of low cost, light weight, easy manipulation, and diversity of services.

An object of the invention is the incorporation of the above features in a small powerful tractor, which may be used in many ways to perform such services as garden plowing and cultivating, lawn rolling and mowing, weed cutting, planting and the like, including also such other services as might ordinarily be performed by a light draft animal.

Another object of the invention is to provide a tractor of the character stated, which incorporates certain novel structural improvements whereby manipulation of the device is greatly facilitated, resulting in substantially reducing fatigue and conserving the time and effort of the operator.

A further object is to provide in a tractor of the kind referred to, novel and advantageous control means designed to enhance the operation and the versatility of the device.

Another object is to provide the device with means whereby are facilitated and simplified the interchanging of tools or attachments, and the making of any repairs or replacements of parts that might become worn or damaged during the lifetime of the tractor.

Another object is to provide the tractor with various desirable features of advantage and convenience to the user, all as will be explained in detail hereinafter.

The foregoing and other objects are attained by the means described herein and illustrated in the accompanying drawings, in which:

Fig. 1 is a side elevational view of the improved tractor.

Fig. 2 is a cross-sectional view on an enlarged scale, taken on line 2—2 of Fig. 1.

Fig. 3 is a rear view of the cultivator attachment illustrated at the rear of the tractor frame, upon Fig. 1.

Fig. 4 is an enlarged plan view of a hitch member for the cultivator attachment.

Fig. 5 is a fragmental elevational view of a clutch control assembly illustrated at the left of Fig. 2.

Fig. 6 is a front elevational view of the tractor, showing the details of a kick stand and motor mount, which form details of the invention.

Fig. 7 is a perspective view of the front end of the tractor frame, illustrating the kick stand and a lawn mower attachment, the motor for driving the tractor being omitted.

Fig. 8 is a detail perspective view of a lawn mower attachment bracket which is illustrated also by Fig. 7.

Tractors intended for service in the care of gardens and lawns, previously have been introduced to the market at various times and in considerable numbers, in the hope of popularizing that type of machine to such an extent as to render the manufacture thereof sufficiently profitable to warrant sales at low costs. Up to the present time that hope has not been realized, and it is now appreciated that failure to popularize the garden tractor resulted from a lack of basic considerations that should properly enter into the mechanical designing of such a machine. By way of example, it is common knowledge that garden tractors heretofore have been undesirably large, heavy and difficult for the average user to manipulate. The problem, therefore, has been to arrive at a structural design that would reduce size and weight, while at the same time retaining the necessary power, durability, and traction factors, with provision made for easy manipulation in service.

Other disadvantages of tractors heretofore proposed, were that they performed only a few services, and were therefore not sufficiently versatile in service ability to warrant expenditure of the funds necessary for the purchase of the machine. It was found that tractors suitable for plowing and cultivating, for example, were not suitable for use in mowing and raking a lawn, and conversely, machines suited for mowing and raking a lawn were wholly inadequate to perform the services of plowing and cultivating in the garden. In addition to the foregoing disadvantages garden tractors as previously offered had a high center of gravity and were poorly balanced, with the result that normal usage imposed strain and fatigue upon the person of the operator to such an extent as to seriously impair productivity and the ability to carry a given job to completion with a minimum expenditure of time and effort. The work of applying and removing tools and attachments to the prior machines, likewise was a job of considerable magnitude, and in many instances required such mechanical knowledge as was not within the experience of the average user. It was not unusual to find that the application and removal of attachments and tools required the services of two persons, particularly when the tractor was of the single traction wheel type.

The foregoing objections and disadvantages could be elaborated upon considerably, by taking into account all of the various types of tractors which heretofore have been offered upon the market, but since the present specification is to be devoted to an explanation of the improved machine and its advantages, rather than to the faults and disadvantages of others, the statements above presented will suffice in providing a basis upon which to establish the merits of the present machine. It will become evident as the description proceeds, that the present machine obviates all of the undesirable features and disadvantages of the prior machines, while at the same time incorporating many advantages and improvements of merit.

Referring to the drawing, the characters 12 and 13 indicate separate side members spaced apart in substantial parallelism to constitute the frame of the tractor. The side members may be joined by means of a rear frame member 14 arranged in spanning relationship thereto, and fastened to the rear ends of the side members in any suitable manner, as by means of bolts 15. Rear frame member 14 may properly be referred to as a hitch mount, by reason of the fact that it supports such tools or attachments as are to be pulled or dragged in the operation of the tractor.

At the forward ends, the frame side members 12 and 13 are connected and maintained in spaced parallelism by means of the motor mounting element, which is most clearly illustrated at 16 of Fig. 7. Attachment of the motor mounting element to the side members may be effected by means of screws, bolts or other fasteners 17, and by means of similar fasteners 10 as shown, adapted to pass through the series of openings 18 of the motor mounting element. As will be understood, screws or bolts located as indicated at 17 and 18, and entering endwise into threaded bores in the forward ends of the side members, will serve to maintain a substantially rectangular disposition of the frame parts as a whole. With the motor mounting element 16 fixed relative to the frame side members, a motor 19 may be mounted thereon by passing bolts through the base of the motor and through openings 20 formed in the motor mounting element 16. Although the motor as herein disclosed is an internal combustion motor operating with liquid fuel, it might in some instances be replaced with an electrically powered motor, when desired.

The motor preferably is mounted upon the tractor with its main shaft 21 in substantial parallelism with the major axis of the tractor frame, and it may carry a pulley or other power transmission element 22 arranged to drive a worm shaft 23 journaled in bearings provided in the frame side member 13 (Fig. 1). Shaft 23 extends forwardly through an opening 24 of the motor mounting element 16 (Fig. 7), and carries a power transmission element 25 which may be in the form of a pulley, this pulley being driven from pulley 22 by means of a suitable belt 26. This drive, of course, might obviously be effected using sprockets and a chain in place of the belt and pulley referred to. In furtherance of the effort toward compactness, weight reduction, and lowering the center of gravity, the power transmission element 25 may depend into a well or depression 27 formed in the motor mounting element as illustrated by Figs. 6 and 7. For convenience in forming the well 27 and other parts of the motor mounting element, the latter may be fabricated as a casting of suitable metal, or if desired, it may be produced from pressed sheet metal. The frame side members 12 and 13 preferably are cast from aluminum or other light-weight metal.

Shaft 23, which is journaled in antifriction bearings near the opening 24 at its forward end, and at the location 28 near its rear end, carries a worm 29 which is fixed to the shaft, and which engages the teeth of a worm gear 30 keyed to the traction wheel shaft 31. The worm gear is adapted to run in oil or grease contained within the gear case 32 which is formed integrally with the frame side member 13, said case being closed by means of a removable cover 33 screwed, bolted or otherwise detachably mounted upon the gear case at the locations 34. A sufficient number of fasteners 34 are furnished about the periphery of the gear case cover, to avoid the possibility of lubricant leakage, as will be understood.

It may be noted that the worm gear will constantly pick up lubricant from the sump within the gear case, and carry it to the worm 29 which overlies the worm gear. By so disposing the worm above the gear, an opportunity is afforded for further lowering the center of gravity of the tractor, while at the same time the lubricant is not churned by the activity of the worm, thereby avoiding the liability of bringing sludge and other foreign particles into contact with the engaging teeth of the worm and worm gear. Another important advantage of this arrangement is that the overdriving of the worm gear by the worm wheel tends to lift the forward end of the tractor when the tire meets with excessive resistance while traveling in a furrow or other heavy soil. Under normal circumstances, however, the weight of the motor at the forward end of the tractor frame tends to overbalance the tractor forwardly and downwardly, thereby requiring the operator to press downwardly upon the handles 35, which results in a desired increase of traction between the tire and the earth upon which it rests. It is highly desirable that the tractor frame be weighted at its forward end and ahead of the traction wheel, as this is a factor which is chiefly responsible for obtaining the greatest possible efficiency of operation, maximum power at the traction wheel, and ease of manipulation for the benefit of the operator. The forward end of the frame serves also to facilitate the application and operation of a combined kick stand and bumper 36, which when lowered maintains the tractor in a standing position with the handles 35 at a normal elevation convenient to the operator.

The handles 35, two of which are provided, are secured to the upper free ends of the shafts 37 and 38, these shafts preferably being divergent in the direction of their upper ends, and anchored in sockets 39 at their lower ends. The sockets are formed integrally with the frame side members 12 and 13, and may be inclined at a convenient angle to dispose the handles at a proper elevation with relation to the hands and arms of the operator. One of the shafts, such as 38, may be furnished with a finger piece or abutment 40 attached to a flexible wire or cable 41 which has a connection to the motor carburetor at 42. The other shaft 37 may carry a lever 44 pivoted at 43 to control the clutch for the traction wheel, through the agency of a clutch control rod 45. The upper end of the rod may be pivoted to handle 44 at the location 46. The throttle control wire or cable 41 may desirably extend through the shaft 38, and emerge therefrom at an opening 47 provided in the socket portion of the frame side member 13. By means of the controls 40 and 44, the speed of the motor may be governed at the will of the operator, and he may control the forward movement of the tractor by means of a clutch to be later described. The fuel tank for the motor is indicated by the character 48, said tank being secured to the tractor frame or to the shafts 37 and 38 in any suitable manner. Set screws or other suitable fasteners 49 may serve to anchor the lower ends of shafts 37 and 38 within their respective sockets.

The drive from the motor shaft to the traction wheel 50 is unique in design, and affords a number of special advantages increasing the versatility of the tractor. The design not only results in great simplicity and elimination of delicate parts, but affords also the advantage of maintaining the traction wheel shaft 31 in motion so that it may be used as a driving element for other machines or accessories so long as motor 19 is in operation, and irrespective of movement of the tractor and its traction wheel. Moreover, the shaft 31 is a slow speed shaft, and accordingly may be utilized in operating slow speed accessories or attachments, such as planters, harvesters, rotary rakes, pump jacks and the like. For these purposes the shaft may be furnished with a suitable power take-off device, for example a pulley 51 or a sprocket 52, as illustrated by Fig. 2.

With further reference to the traction wheel drive as shown upon Fig. 2, it is to be noted that worm gear 30 has a hub 53 encircling the shaft 31, and is keyed at 54 to said shaft. A bushing 55 surrounds the shaft and extends through the gear case 32, and at the same time provides a thrust bearing for the hub of the worm gear. The bushing may be pressed into the opening 56 of the gear case, and thereby be precluded against rotation.

A dog clutch element 57 is keyed as at 58 to the shaft adjacent to bushing 55, and may be held against lengthwise movement along the shaft in any suitable manner, as by means of a pin, or set screw 59. The dog clutch element 57 is rotatable within the hub 60 of wheel 50, said hub being fixed to the wheel as by means of a series of bolts 61. The hub includes an extension 62 which, by means of a set screw or other fastening device 63, is fixed to a second dog clutch element 64 rotatably mounted upon the wheel shaft 31. At the extreme outer end of extension 62 is furnished a perforated washer 65 which forms an end closure for a chamber 66 adapted to house a compression spring 67. Spring 67 surrounds the shaft 31 and tends constantly to project the clutch element 64 into engagement with the stationary clutch element 57.

The washer or bushing 65 is fixedly mounted upon the traction wheel shaft, and is slidably received within the hollow interior or bore of hub extension 62. Accordingly, to disengage the clutch elements, it is necessary only to bodily shift the hub to the left (Fig. 2), thereby causing the hub to draw the clutch element 64 away from the clutch element 57, against the force of spring 67. In so shifting the hub to the left, it will move over the boss 68 of frame member 12, while the washer or bushing 65 remains in abutment with the inner end of said boss 68. The entire wheel assembly as a unit, therefore, will be shifted toward the frame member 12 to the extent necessary for disengagement of the clutch elements. This shifting of the wheel unit does not shift the main shaft 31, however, due to the fact that it has a shoulder 69 abutting the end of boss 68. Longitudinal movement of the shaft in the opposite direction is precluded, of course, by reason of the fact that the fixed clutch element 57 abuts the stationary gear case 32 in the region of bushing 55.

The character 70 indicates a fitting through which lubricant may be injected to supply an axial bore 71 of the main shaft, said bore terminating in openings 72 and 73 which direct lubricant to the clutch mechanism and to the bearing surface furnished by the boss 68. The bearing provided by boss 68 may be bushed as desired, or may be equipped with antifriction bearing means. The same may apply at the location 74, where the shaft 31 extends through the gear case cover 33.

With further reference to the power take-off, this device may be in the form of a stud shaft 75 carrying the pulley and/or sprocket at its outer end, while the inner end thereof is screwed into the internally threaded bore 76 of the main shaft. For tightening the stud shaft relative to the main shaft, one or more flats 77 may be provided on the stud shaft to receive a wrench or tool, used in applying or removing the power take-off assembly.

The traction wheel assembly is provided with a clutch throw-out mechanism to be actuated by means of the handle lever 44 and its associated clutch control rod 45. This clutch throw-out device is clearly illustrated upon Figs. 2 and 5, and will be seen to comprise a bell crank 78 pivoted upon a bracket 79 carried by the frame member 12. The pivot for the bell crank is indicated at 80, and is so located as to cause the finger 81 riding in the groove 82 of the wheel hub, to force the wheel hub to the left in opposition to the compression spring 67 whenever the bell crank is rotated in clockwise direction (Fig. 2). The necessary rotational movement of the bell crank may be effected by means of a link 83 pivoted to the arm 84 of the bell crank, said link having pivotal connection at 85 with a plate 86 which is pivoted upon the frame at the location 87. At 88 the control rod 45 is pivotally mounted upon plate 86, so that by referring to Fig. 5, it will be evident that pressure applied to the lever 44 in the direction of handle 35, will result in such movement of plate 86 as will cause the bell crank 78 to shift the hub 60 to the left, as seen in Fig. 2, for disengaging the clutch. The control rod 45 may pass through an opening 89 provided in the frame member 12 beneath the handle socket 39.

As will be evident, release of the hand lever 44 will permit engagement of the clutch, under the influence of compression spring 67. However, should it be considered desirable to lock the clutch in disengaged position, a suitable latch for the purpose may be applied at the handle lever 44, as shown upon Fig. 5. The latch may be of any approved type, although in the illustration given, it consists of a hooked lever 90 pivoted at 91 upon the handle portion of shaft 37, with the hook portion 92 thereof adapted to engage the forward edge of a slot at 93, formed in the handle piece 44. The latch may be rotated about its pivot 91 to the latching or releasing position, by means of a finger piece 94 conveniently located atop the handle 35 of the shaft 37. From the foregoing, it will readily be evident that the clutch for the traction wheel may be kept disengaged by means of the latch, while the power take-off is in use, the tractor being stationary although its main shaft 31 may be continuously rotating. A second power take-off may be applied at the end of worm shaft 23, as indicated at the character 95, for the purpose of operating the higher speed types of attachments, accessories, or independent machines to be driven from the tractor motor. Other power take-offs, of course, may be applied directly to the motor shaft 21, if desired.

The details of the combination kick stand and forward bumper are illustrated by Figs. 1, 6 and 7. This device, indicated generally by the character 36, may consist of a substantially U-shaped rod or bar having a short leg 96, a long leg 97, and the connecting portion 98, the legs being in spaced substantial parallelism. The short leg has its free end journaled for axial and rocking movement within the smooth bore 99 of a boss 100, the latter being preferably integral with the motor mounting element 16. A spring 101 under compression between a fixed collar 102 and a face 103 of the motor mounting element, serves constantly to yieldingly project the free end of leg 96 into the bore of boss 100. The spring permits shifting movement of the combined kick stand and bumper element bodily outwardly of the motor mounting element, whereby the connecting portion 98 may be freely swung to dispose the leg 97 from the lowered position of Fig. 6 to the elevated position of Fig. 7. In the lowered position, the leg 97 serves as a foot supporting the tractor in the upright position of Fig. 1, whereas in the elevated position of Fig. 7, said leg extends across the front of the motor mounting element to perform the services of a forward bumper. Leg 96 extends through a bearing aperture 103a formed in the side 104 of the motor mounting element.

As is most clearly illustrated by Fig. 7, the side 104 of part 16 is furnished with a laterally extending rib 105 which is provided with a notch 106 having opposed walls spaced apart a distance slightly greater than the diameter of the bar or rod constituting the portion 98 of the combined kick stand and bumper. A forwardly extending section 107 of the rib, likewise integral with the motor mounting element, furnishes a smooth track surface 108 along which the portion 98 of the kick stand may slide when moved from the elevated to the lowered position, or vice versa. As will be understood, movement of the kick stand from the elevated position of Fig. 7 toward the lowered position of Fig. 6, is accompanied by bodily movement thereof outwardly of the tractor frame, due to the cam action imposed by the track 108; and as the portion 98 of the stand reaches the notch 106, it will snap into the notch to the Fig. 6 position, under the yielding influence of spring 101. Once the portion 98 of the stand has entered the upright notch 106, it may not thereafter be swung to the elevated position without first shifting the stand bodily outwardly against the force of spring 100, to an extent necessary for disengagement from the notch. This bodily shifting of the stand and bumper element may easily be effected without inconvenience to the operator, by merely turning the tractor pivotally about the vertical axis of the traction wheel, while the leg 97 is in contact with the earth, thereby to disengage the connecting portion 98 from the notch, and as soon as the disengagement is effected, the operator may tilt the tractor bodily forwardly to place the element 98 upon track 108, whereupon the slope of the track forwardly and inwardly toward the axis of the tractor frame serves to automatically cam the stand toward the elevated position of Fig. 7. The slope of the track 108 combined with the force of spring 101, renders this movement of the stand automatic, so that it assumes the elevated position without the expenditure of any substantial effort on the part of the operator.

To lower the stand from the Fig. 7 position, the operator need only apply a downward force upon leg 97, whereupon an inclined face 148 of the rib is engaged by the connecting portion 98 and forces it bodily outward onto the track 108, whereupon continued application of force brings the stand to the lowered position at which it is held by notch 106. It should be understood in connection with the foregoing explanation, that manipulation of the combined kick stand and bumper is possible only upon detachment of the lawn mower 109 illustrated by Fig. 7, there being no purpose in using the kick stand as long as the tractor is supported at its forward end by the lawn mower. The free end 110 of leg 97 may be turned at an angle as shown, to render the kick stand most effective as a bumper, and to preclude the leg from sinking in soft earth and to avoid any tendency of the free end to accumulate mud, vegetation and the like. The arm 97 preferably spans approximately the full width of the motor mounting element at the forward end of the frame. From the foregoing explanation, it will be understood that the combined kick stand and bumper may be manipulated with a minimum of effort and inconvenience to the operator of the tractor.

As was previously mentioned herein, provision is made for quick and effortless attachment of various types of implements and tools to the tractor. By way of example, the drawings illustrate the attachment of a lawn mower in Fig. 7, and a cultivator in Fig. 1. With reference to the lawn mower attachment, it will be noted from the disclosure of Fig. 1 that the reinforcing gussets formed by the sides 104 of the motor mounting element are formed with forwardly and upwardly inclined flat faces 112 through which extend the attachment bolts 113. Forwardly of the bolts the gussets are provided with angular abutments 114 which are preferably at right angles to the faces 112, the abutments providing seats upon which may rest the forward leg 115 of an angle iron or other suitable member 116 adapted to mount the opposed brackets 117 that connect with the frame of the lawn mower. Each bracket 117 may comprise an angle member as illustrated by Fig. 8, one leg of which is provided with a perforation 119 adapted to accommodate an extending pin or lug 120 located inwardly of the mower frame. For this reason, the pin or lug is shown behind the mower wheel 121. The other leg 122 of the bracket may incorporate a series of elongated slots 123 for the reception of one or more bolts 124 passing through the angle member 116 and securing the bracket in position thereon. By means of the elongated apertures 123, the mower mount consisting of the members 116 and 117 may be adjusted as to its length, for accommodating mowers of various sizes. The bolt 113 may or may not pass through one of the elongated perforations 123 of the bracket. The character 125 indicates the cutting reel of the lawn mower, whereas 126 indicates the trailing roller customarily applied to a lawn mower.

In using the tractor with the lawn mower attached as indicated herein, the operator will find that it may easily be steered along any desired course by simply guiding the tractor by means of the handle bars in the ordinary way. Since the mower wheels are driven only by virtue of their advancing movement and contact with the ground, as in the case of any hand operated mower, the cutting action of the mower may be instantly terminated by the simple expedient of lifting the tractor handles and slightly elevating the traction wheel above ground level, thereby precluding advancement of the tractor and the mower. By properly manipulating the clutch lever, the mowing operation may be performed with a forward and back motion as is sometimes necessary when cutting a heavy or overgrown lawn, the tractor being easily retracted manually in a reverse direction when the clutch is disengaged. By removing the pair of bolts 113 at opposite sides of the motor mounting element, the mower attachment may easily and quickly be disconnected from the tractor, and replacement thereof is an equally simple and effortless operation.

It is to be understood that the transverse mounting bar 116 and brackets 117 are capable of such modification or change as may be necessary to adapt any standard lawn mower for attachment to the forward end of the tractor. In the example illustrated, the parts 116 and 117 are rigid and may not be moved relative to the tractor frame when the several bolts 113 and 124 are properly tightened. Bar 116 is considerably longer than the width of the motor mounting element, and will preferably extend equal distances at opposite sides of the tractor frame. The angularity of the face 112 at each side of the motor mounting element determines the forward and downward inclination of the mower supporting brackets 117.

It may here be noted that the same arrangement as is used in attaching the lawn mower may be employed also for attaching implements such as snow plows, lawn rollers, sickles and the like, which would ordinarily not lend themselves to attachment at the rear of the tractor frame. Plows, cultivators, drags, discs, harrows and similar earth working implements of a similar nature will preferably be attached at the rear of the tractor frame, and to exemplify such attachments, the drawings illustrate by way of example a cultivator attachment including a unique means of attachment to the frame. The cultivator attachment is described as follows.

The characters 127, indicate a series of cultivator plows each of which includes a forwardly extending arm 128, the free ends of which arms are clamped between a pair of squeeze plates 129 and 130 by means of the bolts indicated at 131. Intermediate the ends of the squeeze plates, and in rigid relationship thereto, is attached an upright fork having spaced parallel arms 132 and 133. The base 134 of the fork may be welded, bolted, or otherwise securely attached to the cultivator plow assembly, disposing the arms 132 and 133 at an upward and rearward inclination. These arms are adapted to extend between the spaced parallel legs 135 and 136 of a U-shaped hitch element whose attachment ears 137 are bolted as at 138 to the cooperative hitch member 14 of the tractor frame. Legs 135 and 136 are joined by means of an integral strut 139 which is inclined at approximately the same inclination as the fork arms 132 and 133, and perforated at 140 to accommodate a bolt 141. This bolt may preferably be in the form of a carriage bolt having at one end a head 142 with an adjacent flattened shank portion to prevent turning of the bolt as a nut is tightened thereon. The shank extends between the arms 132 and 133, and through the perforation 140 of the hitch element 139, and to the extending end of the shank is threadedly applied a nut as shown at 141a upon Fig. 1. Since the bolt head 142 is sufficiently large to bear against corresponding edges of the fork arms 132 and 133, it will be evident that by loosening the bolt 141, the fork may be adjusted in an upward and downward direction to elevate and lower the cultivator plows with respect to the tractor frame. At any adjusted position of the fork, the bolt 141 may be tightened by means of a wrench or the like, to maintain the desired cultivating depth of the plows. The legs 135 and 136 of the hitch element embrace the arms 132 and 133 of the fork, to preclude spreading of the fork arms as the bolt 141 is tightened against the strut 139 of the hitch element.

With the rear hitch designed as just explained, the attachment and detachment of cultivating tools, plows, and a number of other implements may be effected expeditiously and with a minimum expenditure of effort on the part of the operator. Adjustment for cultivating and plowing depth is easily accomplished at the single bolt 141, and with the aid of the kick stand lowered to the position of Fig. 6, the adjustment is very easily performed. A cultivator attachment constructed as described will be found rigid and durable in service, and in the event of breakage of the plows, these may easily be replaced by simply loosening one or more of the clamping bolts 131.

Referring now to Fig. 1, and particularly to the motor 19, attention is directed to the element indicated at 145 which represents in conventional manner an automatic clutch mounted upon the motor shaft 21. This automatic clutch is of common well known construction, and its purpose is to complete the driving relationship between shaft 21 and power transmission element or pulley 22, at speeds of the motor in excess of idling speed. Thus, by manipulating the throttle control button 40 at the handle of the tractor, the motor may be operated at idling speed without effecting transmission of power between the motor shaft and the pulley 22, and under such a condition the tractor will not move even though the traction wheel clutch 57—64 is engaged. This is particularly advantageous when starting the motor, and constitutes a safety feature whereby the tractor is precluded from running over the operator or getting out of control as the motor is started on partially closed throttle. The motor may be started by means of a cable or cord applied to the starter pulley 146, or by other common means such as a crank or pedal in accordance with the usual practice.

In the use of the tractor for certain purposes, the automatic clutch engaging only at the higher motor speeds facilitates manipulation of the tractor, particularly when it is necessary or desirable to frequently disengage the motor drive in reversing the direction of travel of the tractor manually. To most conveniently accomplish frequent reversals, smoothly and without inducing premature wear of the parts, the operator need only close and open the throttle in alternation, thereby disengaging and engaging the automatic clutch. One suitable clutch for the purpose mentioned, is the well known mercury clutch which is available upon the market. Other forms of automatic clutches, of course, may be substituted, if desired. The tractor may be constructed without the automatic clutch in some instances, and in that event the pulley or power transmission element 22 may be fixed directly to the motor shaft.

In view of the foregoing description and the attached drawings, it should readily be appreciated that the device of the invention embodies many desirable advantages and features of merit, as outlined in the statement of the objectives of the invention, and which heretofore were not obtainable in small tractors for home and garden use. In line with common engineering and production practices, the device may be subject to various modifications and changes in the structural details thereof comprehended within the scope of the appended claims, without departing from the spirit of the invention.

What is claimed is:

1. A garden tractor which comprises a main frame, a traction wheel journaled on said main frame, a motor mounting bracket attached to and extending forwardly of said main frame, a motor mounted on said bracket forwardly of the wheel to overbalance the frame forwardly, handle means attached to said frame and extending rearwardly thereof, there being a transverse bore in one side wall of said bracket, a resilient U-shaped bumper-stand having a pair of spaced, substantially parallel side members, and a leg member connecting said side members, one of said side members being journaled in said bore, the other side member substantially spanning the tractor, said other side member having a free end, said bumper-stand being adapted to swing between a raised substantially horizontal position for forming a bumper and a lowered substantially vertical position for forming a stand, and means for holding the bumper-stand in each of said positions.

2. A garden tractor in accordance with claim 1 characterized by the fact that a substantially horizontal rib extends outwardly from said bracket side wall below and forwardly of the bore, that said rib is provided with an upright notch immediately below the bore, that a spring resiliently urges said one of the side members of the bumper-stand in a direction to bring the leg member thereof against said bracket side wall, said notch receiving the leg member of the bumper-stand when in lowered position, the leg member resting on said rib when in raised position.

3. A garden tractor in accordance with claim 1 characterized by the fact that a substantially horizontal rib extends outwardly from said bracket side wall below and forwardly of the bore, that said rib is provided with an upright notch immediately below the bore, that a spring resiliently urges said one of the side members of the bumper-stand in a direction to bring the leg member thereof against said bracket side wall, said notch receiving the leg member of the bumper-stand when in lowered position, the leg member resting on said rib when in raised position, said rib sloping forwardly and inwardly from the notch to form a track for guiding the leg member into said notch as the bumper-stand is swung from raised to lowered position.

4. A motor mounting bracket for garden tractors and the like, comprising a frame mounting portion and a motor supporting plate, opposed side walls of said bracket forming gussets between the plate and the frame mounting portion, one of said gussets being bored transversely to provide a bearing, a seat upon and beneath each gusset to accommodate a lawn mower attachment, fastening means at said seats, a rib extending laterally from one of the gussets and having an upright notch located adjacent to the bearing, the notch being open at one side of the bracket, a track on the rib beginning at the notch and extending forwardly toward the mower attachment seat, a bar having a pair of spaced substantially parallel legs and an intermediate portion connecting corresponding ends of the legs, one leg being journaled in the bearing aforesaid to dispose the intermediate portion of the bar in position to ride upon the track of the rib, and means operative upon said leg to yieldingly urge the intermediate portion of the bar laterally toward the rib and the notch, the other leg being extended to substantially span the gussets.

5. A motor mounting bracket for garden tractors and the like, comprising a plate having a perforated upstanding rear wall and a motor supporting surface substantially at right angles to said wall, the supporting surface being recessed at one side to accommodate a power transmission wheel, opposed side walls on said bracket forming gussets to reinforce the upstanding rear wall, said gussets including a seat beneath the level of the motor supporting surface to accommodate a lawn mower attachment, mower attachment fasteners at said seats, a divided rib extending laterally from one of said gussets, the division of the rib providing an upright notch open at the side of the bracket, a track on the rib beginning at the notch and extending away from the upstanding wall, said track being directed forwardly and inwardly from the notch, a bar having a pair of spaced substantially parallel legs and an intermediate portion connecting corresponding ends of the legs, one leg being pivoted upon the gusset adjacent to the notch for disposing the intermediate portion of the bar in position to ride upon the track of the rib, the other leg being extended to span the gussets, and means for yieldingly urging the intermediate portion of the bar in the direction of the gusset which carries a rib.

6. A motor mounting bracket for a garden tractor having a framework and a traction wheel journaled thereon, said bracket comprising a main frame having opposed side walls, means for attaching said main frame to the forward end of the tractor framework in front of the traction wheel, means on said bracket for supporting the motor, means for removably attaching a lawn mower to the underside of said bracket, a substantially horizontal rib extending laterally from one side wall of the main frame, said rib having an upright notch, said side wall being bored transversely adjacent and above the notch, a U-shaped bar having a pair of spaced substantially parallel side members and an intermediate portion connecting said side members, one side member being journaled in said bore, the other side member substantially spanning the bracket, and means connected to said one side member for urging the intermediate portion of the bar toward the rib and the notch, said U-shaped bar being swingable from a substantially horizontal position in which the other side member extends in front of the main frame and the intermediate portion rests on the rib to a substantially vertical position in which said other leg extends below the main frame and the intermediate portion is received in said notch.

CARL VAN AUSDALL.

REFERENCES CITED

The following references are of record in the file of this patent:

UNITED STATES PATENTS

| Number | Name | Date |
|---|---|---|
| 1,104,696 | Moline | July 21, 1914 |
| 1,246,696 | Ammann | Nov. 13, 1917 |
| 1,325,244 | Galardi et al. | Dec. 16, 1919 |
| 1,553,088 | Link | Sept. 8, 1925 |
| 1,612,823 | Keese | Jan. 4, 1927 |
| 1,851,142 | Welbourne | Mar. 29, 1932 |
| 1,869,746 | Hoke | Aug. 2, 1932 |
| 2,097,351 | Smith | Oct. 26, 1937 |
| 2,133,512 | Herge | Oct. 18, 1938 |
| 2,159,448 | Olson | May 23, 1939 |
| 2,331,976 | Hare | Oct. 19, 1943 |
| 2,368,290 | Donald | Jan. 30, 1945 |
| 2,401,796 | Raitch | June 11, 1946 |
| 2,474,085 | Albright | June 21, 1949 |

FOREIGN PATENTS

| Number | Country | Date |
|---|---|---|
| 559,013 | Germany | Sept. 14, 1932 |
| 607,688 | Germany | Jan. 7, 1935 |